(12) United States Patent
Nikkeshi et al.

(10) Patent No.: US 6,194,489 B1
(45) Date of Patent: Feb. 27, 2001

(54) RESIN ADDITIVE

(75) Inventors: Susumu Nikkeshi, Miyagi-ken; Maki Kanno, Fukushima, both of (JP)

(73) Assignee: Tohoku Munekata Co Ltd, Fukishima-ken (JP)

( * ) Notice: Subject to any disclaimer, the term of this patent is extended or adjusted under 35 U.S.C. 154(b) by 0 days.

(21) Appl. No.: 09/376,334

(22) Filed: Aug. 18, 1999

(30) Foreign Application Priority Data

Jan. 20, 1999 (JP) ............................................. 1-2022
Feb. 3, 1999 (JP) ............................................. 2-6269
Feb. 3, 1999 (JP) ............................................. 2-6319

(51) Int. Cl.$^7$ .................................................... C08K 3/00
(52) U.S. Cl. ........................... 523/212; 423/335; 423/625; 428/404; 428/405; 428/406; 428/407; 523/214; 523/216; 523/217

(58) Field of Search ..................................... 423/335, 625; 428/404, 405, 406, 407; 523/212, 214, 216, 217

(56) References Cited

FOREIGN PATENT DOCUMENTS 0818502    1/1998    (EP) .

Primary Examiner—Edward J. Cain

(57) ABSTRACT

The present invention provides a resin additive obtained by subjecting inorganic particles of silica or alumina to surface treatment with tannic acid and further subjecting them to surface treatment with a coupling agent, or subjecting inorganic particles to surface treatment with tannic acid and then subjecting them to surface treatment with a phenone compound or saccharides, followed by further subjecting them to surface treatment with a coupling agent. The above resin additive has an effect to provide a thermoplastic resin with heat stability in heating and melting the resin and prevent a reduction in the IZOT impact strength.

11 Claims, 1 Drawing Sheet

RESIN ADDITIVE

FIELD OF THE INVENTION

Thermoplastic resins such as a polycarbonate resin (PC), a polybutylene terephthalate resin (PBT), a polyethylene terephthalate resin (PET), a blend thereof and a mixture obtained by blending one or a plurality of the above resins with other resins bring about thermal decomposition when they are heated and molten in various molding processes and lower in mechanical properties. The present invention relates to a resin additive which prevents thermal decomposition thereof and to a resin additive which prevents thermal decomposition (reduction in molecular weight) and does not reduce the impact strength to a large extent.

DESCRIPTION OF THE RELATED ART

Resin materials, particularly respective resins of PC, PBT and PET are heavily reduced in a molecular weight in melting by heating, so that the molecular weights have notably been reduced by heat given in various molding processes and shear stress exerted in kneading. Accordingly, it was difficult to recycle sprues and runners produced in molding as well as recycling of the products. According to researches made by the present inventors, the resins described above could be inhibited from lowering in a molecular weight in heating and melting by adding inorganic particles subjected to surface treatment with tannic acid to the resins, but there was the problem that the IZOD impact strengths were reduced.

Intensive researches of a resin additive of tannic acid continued by the present inventors have resulted in finding that thermoplastic resins can be inhibited from lowering in a molecular weight in heating and melting and prevented from lowering in an IZOD impact strength by adding to the above resins, a resin additive obtained by subjecting inorganic particles to surface treatment with tannic acid and further subjecting them to surface treatment with a coupling agent or subjecting the inorganic particles to surface treatment with tannic acid and then subjecting them to surface treatment with a phenone compound or saccharides, followed by further subjecting them to surface treatment with a coupling agent.

SUMMARY OF THE INVENTION

Accordingly, the first object of the present invention is to provide a resin additive which is obtained by allowing the surface of inorganic particles to be contacted with a tannic acid solution and further treating them with a coupling agent or subjecting the inorganic particles subjected to surface treatment with tannic acid to surface treatment with a phenone compound or saccharides and subsequently subjecting them to surface treatment with a coupling agent and which not only can thermally stabilize a resin but also can prevent the resin from lowering in an IZOD impact strength. According to the present invention, there can be provided, a resin additive which can thermally stabilize the resin by tannic acid and reduce the impact stress by the saccharides or phenone compound and which strengthens the bond of the inorganic particles with the matrix resin by the coupling agent to thereby prevent not only a reduction in the molecular weight caused by a thermal degradation of the resin but also a reduction in the IZOD impact strength.

The second object of the present invention is to provide a resin additive which not only provides a thermoplastic resin with heat stability in heating and melting the resin but also prevents the resin from lowering in an IZOD impact strength.

Further, the third object of the present invention is to provide a resin additive which not only provides a thermoplastic polycarbonate resin, a thermoplastic polyester resin or a thermoplastic resin comprising these polycarbonate resin and polyester resin with heat stability in heating and melting the resin but also prevents the resin from lowering in an IZOD impact strength.

Another object of the present invention is to provide a resin additive which makes it possible to recycle the product.

Still another object of the present invention shall become more distinct from the following explanations.

DISCLOSURE OF THE INVENTION

It has been found that the preceding objects of the present invention can be achieved by:

1. a resin additive prepared by subjecting inorganic particles to surface treatment with tannic acid and further subjecting them to surface treatment with a coupling agent, 2. a resin additive prepared by subjecting inorganic particles to surface treatment with tannic acid and then subjecting them to surface treatment with a phenone compound, followed by further subjecting them to surface treatment with a coupling agent, or 3. a resin additive prepared by subjecting inorganic particles to surface treatment with tannic acid and then subjecting them to surface treatment with saccharides, followed by further subjecting them to surface treatment with a coupling agent.

DETAILED DESCRIPTION OF THE INVENTION

The resin additive of the present invention shall be explained below in further details.

The inorganic particles used in the present invention shall not specifically be restricted and may be any inorganic particles as long as they can effectively be used for the objects of the present invention. Specific examples thereof include silica salts such as silica, anhydrous silica, silica gel, talc, clay, mica aluminum silicate and kaolinite, alumina and salts thereof such as aluminates. In addition thereto, inorganic substances staying in a glass state, that is, glass can also be used as an inorganic material in the present invention. Various materials such as oxide glass, particularly silicate glass, powder of glass fiber, glass beads, glass balloon and fly ash can be used. Further, carbon and powder of carbon fiber can be used as well for the inorganic particles. Among them, silica powder is produced in nature and therefore is excellent in profitability, so that it is particularly preferably used. The particle size and form of the inorganic particles used shall not specifically be restricted and are suitably selected and used according to the kind and the use purposes thereof.

Next, tannic acid used in the present invention is a polyhydric phenol compound which forms gallic acid represented by a formula (2) by hydrolysis and is contained widely in plants in the natural world. It is said that to be roughly classified, tannic acid includes two kinds of a hydrolysis type and a condensation type, and both are natural compounds, so that a lot of tannic acid having different structures are present. Tannic acid used in the present invention may be either type. Further, tannic acid is also called tannin and shall not specifically be distinguished therefrom in the present invention.

Chinese gallotannin which is typical hydrolysis type tannin is shown by a formula (1). Further, to specify Chinese gallotannin, it has been confirmed that in Chinese gallotannin, 10 gallic acid groups coordinate in the circumference of a glucose residue on the same surface and 2 gallic acid groups are bonded in a vertical direction. However, the center of the compound is not necessarily restricted to glucose and may be a cellulose base compound in a certain case. Further, a didepside of gallic acid represented by the formula (2) obtained by hydrolysis of tannic acid can be used as well. As described above, tannic acid is a compound contained widely in plants in the natural world, and therefore it is readily presumed that tannic acid is partially different in a chemical structure. In the present invention, hydrolysis type tannic acid and condensation type tannic acid can synonymously be used without putting a distinction therebetween. Quebro tannin and Turkish tannin are shown as tannins having different chemical structures by a formula (3) and a formula (4).

Polyhydric phenol compounds having a dye-fixing effect and a tanning effect for leather are called [synthetic tannins], and among these synthetic tannins, the compounds capable of being effectively used for the objects of the present invention can be used as well in the present invention. At present, tannic acid is used for ink as a daily living article, medically for a hemostatic agent and industrially for a tanning agent for leather and a color fixing agent for a dye. Tannic acid is very soluble in water and lower alcohols and therefore can be used in the form of a solution having a high concentration.

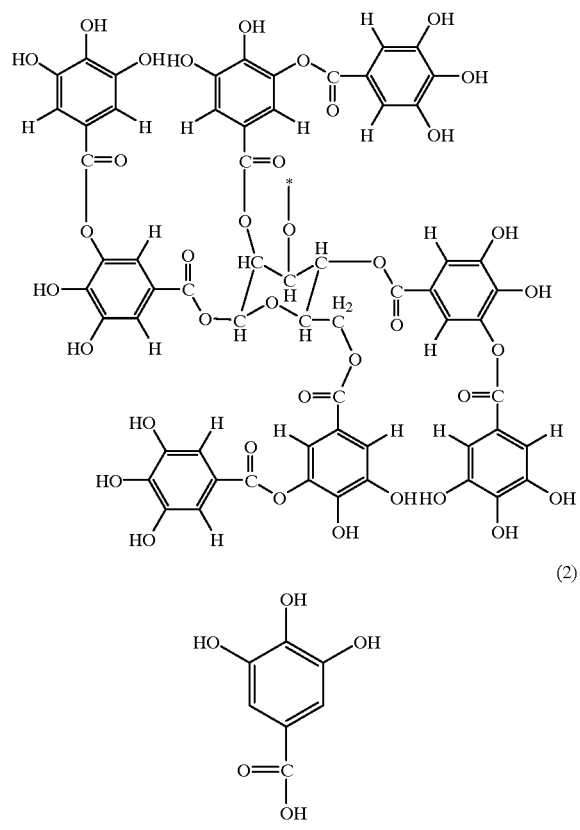

(1)

(2)

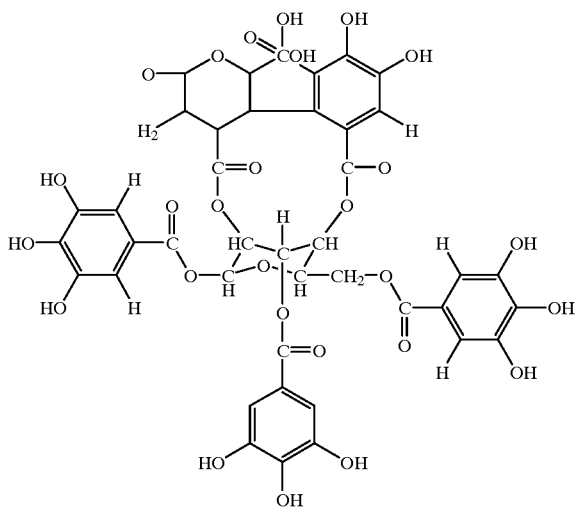

(3)

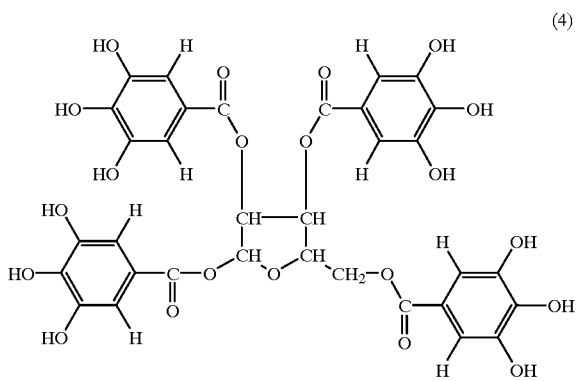

(4)

The treatment of the inorganic particles with tannic acid is carried out by adding the inorganic particles to a solution of tannic acid and stirring to thereby allow tannic acid to be adsorbed thereon, followed by filtering off and drying the inorganic particles. In this case, with respect to the use amount of tannic acid, the inorganic particles are preferably treated in a solution containing tannic acid in an amount of 0.5 to 6.0% by weight (wt %) based on the inorganic particles to be treated. If the amount of tannic acid is smaller than 0.5 wt %, a heat stability effect for the resin is not revealed. On the other hand, even if the amount is more than 6.0 wt %, the effect remains unchanged, and therefore it is meaningless to use more amount than this. A solvent used for the treatment with tannic acid includes water, lower alcohols, tetrahydrofuran, toluene, benzene, acetone, acetonitrile, various ketones and esters. Water and lower alcohols are preferably used. The concentration of the tannic acid solution used in the present invention shall not specifically be restricted as long as it is not more than the saturated concentration of tannic acid at a temperature in allowing tannic acid to be adsorbed on the surface of the inorganic particles, and any concentration can be used. The temperature in allowing tannic acid to be adsorbed on the inorganic particles shall not specifically be restricted, but it is usually a room temperature. Two or more kinds of tannic acid can be used.

Next, the phenone compound used in the present invention is benzophenone or a derivative thereof and is suitably benzophenone itself. It is a matter of course, however, that the phenone compound may be a derivative of benzophenone such as benzophenone-2-carboxylic acid and benzophenone-4,4-dicarboxylic acid. The phenone compound functions in the same way as that of the coupling agent, and therefore the same amount as that of the coupling agent may be used. The use range thereof is preferably 0.4 to 4.2 wt % based on the inorganic particles subjected to tannic acid treatment. If the amount of the phenone compound is too small, the effect is not revealed. On the other hand, if the amount is too much, it reduces the mechanical strength of the resin by functioning as a plasticizer.

The treatment of the tannic acid-treated inorganic particles (abbreviated as particles 1) with the phenone compound is carried out by using a method in which the phenone compound corresponding to 0.4 to 4.2 wt % of the particles 1 to be treated with the phenone compound is dissolved in an organic solvent such as toluene and xylene and the particles 1 to be treated are added thereto and stirred, followed by filtering off and drying the particles 1 treated with the phenone compound (hereinafter abbreviated as particles 2). In this case, the phenone compound and the particles 1 may be added to the organic solvent in any order. The treating conditions with the phenone compound shall not specifically be restricted, and the treating temperature, the treating time and the kind and the amount of the solvent used are suitably selected according to the kinds and the amounts of the inorganic particles and the phenone compound. Two or more kinds of the phenone compounds can be used.

The particles 2 thus treated with the phenone compound are further subjected to subsequent treatment with the coupling agent.

The saccharides used in the present invention include monosaccharides, oligosaccharides and polysaccharides, and various saccharides can be used. In particular, sugar, glucose, maltose and fructose are suited. It is a matter of course that polysaccharides such as anthocyanin, anthocyanidin and saponin and derivatives thereof can be used as well. The saccharides function in the same way as that of the coupling agent, and therefore the same amount as that of the coupling agent may be used. The use range thereof is preferably 0.4 to 4.2 wt % based on the inorganic particles treated with tannic acid. If the amount of the saccharides is too small, the effect is not revealed. On the other hand, if the amount is too much, it reduces the mechanical strength of the resin by functioning as a plasticizer.

The treatment of the tannic acid-treated inorganic particles (particles 1) with the saccharides is carried out by using a method in which the saccharides corresponding to 0.4 to 4.2 wt % of the particles 1 to be treated is dissolved in a solvent such as water and the above particles 1 to be treated are added thereto and sufficiently stirred to allow the saccharides to be adsorbed thereon, followed by filtering off and drying the treated particles 1 to obtain the saccharides-treated particles 1 (hereinafter abbreviated as particles 3). In this case, the saccharides and the particles 1 may added to the solvent in any order. The treating conditions with the saccharides shall not specifically be restricted, and the treating temperature, the treating time and the kind and the amount of the solvent used are suitably selected according to the kinds and the amounts of the inorganic particles and the saccharides. Two or more kinds of the saccharides can be used. The method for treating with the saccharides shall not be restricted thereto, and any method can be used. The particles 3 thus obtained are further subjected to subsequent treatment with the coupling agent.

Silane base coupling agents are preferably used as the coupling agent used in the present invention. Among them, compounds having a terminal group such as an epoxy group, a vinyl group and an amino group are preferably used. To be specific, these Silane base coupling agents include, for example, vinyl triethoxysilane, γ-methacryloxypropyl trimethoxysilane, γ-glycidoxypropyl trimethoxysilane, γ-aminopropyl trimethoxysilane and trifluoropropylmethyl dimethoxysilane. The particularly preferred silane base coupling agents include γ-methacryloxypropyl trimethoxysilane, γ-glycidoxypropyl trimethoxysilane and trifluoropropylmethyl dimethoxysilane.

The silane base coupling agent is used in a proportion of 0.4 to 4.2 wt %, preferably 0.8 to 2.5 wt % based on the weight of the inorganic particles treated with tannic acid. If the surface-treated amount with the coupling agent is small, the effect is not revealed. On the other hand, if the amount is too much, the coupling agent functions as a plasticizer in the resin and reduces the mechanical properties of the resin. Accordingly, both are not preferred.

The treatment of the particles 1, 2 or 3 with the coupling agent can be carried out by various methods, and it can be carried out, for example, by a method in which the coupling agent corresponding to 0.4 to 4.2 wt % of the particles 1 to be treated with the coupling agent or the particles 1 used for producing the particles 2 or 3 is dissolved in water or an organic solvent such as toluene and xylene and the particles 1, 2 or 3 to be treated with the coupling agent are added thereto and sufficiently stirred to allow the coupling agent to be adsorbed thereon, followed by filtering off and drying the treated particles 1, 2 or 3 to obtain the coupling agent-treated particles 1, 2 or 3 (the resin additive of the present invention). In this case, the coupling agent and the particles 1, 2 or 3 may added to the solvent in any order. The treating conditions with the coupling agent shall not specifically be restricted, and the treating temperature, the treating time and the kind and the amount of the solvent used are suitably selected according to the kinds and the amounts of the inorganic particles and the coupling agent. Two or more kinds of the coupling agents can be used.

In addition thereto, a method for treating with the coupling agent includes a method in which the coupling agent or a solution of the coupling agent is sprayed directly on the particles 1, 2 or 3. In this case, it is more effective to leave the particles 1, 2 or 3 subjected to spraying treatment for standing in a closed vessel at a room temperature to about 40° C. for several days to about one month after spraying. Further, there can be used, a method in which the particles 1, 2 or 3, the coupling agent and a resin are molten and kneaded at the same time, but the present invention shall not be restricted to these methods, and any methods may be used.

With respect to the treating order of the inorganic particles in producing the resin additive of the present invention, treatment with tannic acid is usually carried out at first, or treatment with the phenone compound or the saccharides is carried out after the treatment with tannic acid, and treatment with the coupling agent is carried out at last. However, this treating order shall not be restricted thereto, and the treatment may be carried out in any order.

The resin to which the resin additive of the present invention is added shall not specifically be restricted, but polycarbonate resins and thermoplastic polyester resins, particularly polyethylene terephthalate and polybutylene terephthalate are suited. Further, blends thereof and blended resins of one or a combination of a plurality thereof with other resins, for example, PC/ABS, PBT/ABS, PC/PBT, PC/PET and PC/polystyrene are preferably used.

In general, the resin additive of the present invention is added to a resin in a proportion of 0.5 to 3.5 wt % based on the resin.

The inorganic particles subjected to surface treatment with tannic acid allow the molecules of tannic acid to stick strongly on the surfaces thereof. On the other hand, when a resin is thermally decomposed, radical molecules are produced, and if the radical molecules can be turned to stable molecules, the resin can be inhibited from being decomposed. Tannic acid has many hydroxyl groups, and these hydroxyl groups trap radicals produced by a decomposition of the resin. However, it is considered that a lot of the hydroxyl groups are present as well on the outside of tannic acid which sticks firmly on the surface of the inorganic particles, and as a result thereof, it is considered that tannic acid does not have so much wettability to the matrix resin. This results in preventing the resin from combining firmly with the inorganic particles. Accordingly, the IZOD impact strength results in lowering from the intrinsic value of the resin to a large extent. It is expected that two matters of a stabilization of the resin and an inhibition of a reduction in the IZOD impact strength can be achieved at the same time by allowing the inorganic particles subjected to surface treatment with tannic acid or with tannic acid and the saccharides or the phenone compound to adhere firmly to the matrix resin with the coupling agent. On the other hand, it is considered that the phenone compound or the saccharides which is present between the tannic acid layer and the coupling agent layer functions as a so-called cushion which disperses a stress exerted on the resin, whereby an effect to prevent a larger reduction in the IZOD impact strength can be obtained. However, the present invention shall not be restricted by such reason.

The inorganic particles obtained by further subjecting the tannic acid-treated inorganic particles thus obtained or the inorganic particles subjected to surface treatment with tannic acid and subsequently to surface treatment with the phenone compound or the saccharides to surface treatment with the coupling agent become, as described above, a resin additive which can inhibit not only a reduction in the molecular weight but also a reduction in the IZOD impact strength.

Effects of the Invention

As shown in the following examples and comparative examples, the resin additives obtained by subjecting the inorganic particles to surface treatment only with tannic acid can not inhibit the resins from lowering in an IZOD impact strength, but the resin additives of the present invention can inhibit a reduction in the molecular weight as well as a reduction in the IZOD impact strength by further subjecting the inorganic particles subjected to surface treatment only with tannic acid to surface treatment with the coupling agent or to surface treatment with the phenone compound or the saccharides and then to surface treatment with the coupling agent. Accordingly, a thermal stabilization of the resin in heating and melting and an inhibition of a reduction in the mechanical strength can be achieved at the same time by using the resin additive of the present invention.

EXAMPLES

Figure 1:
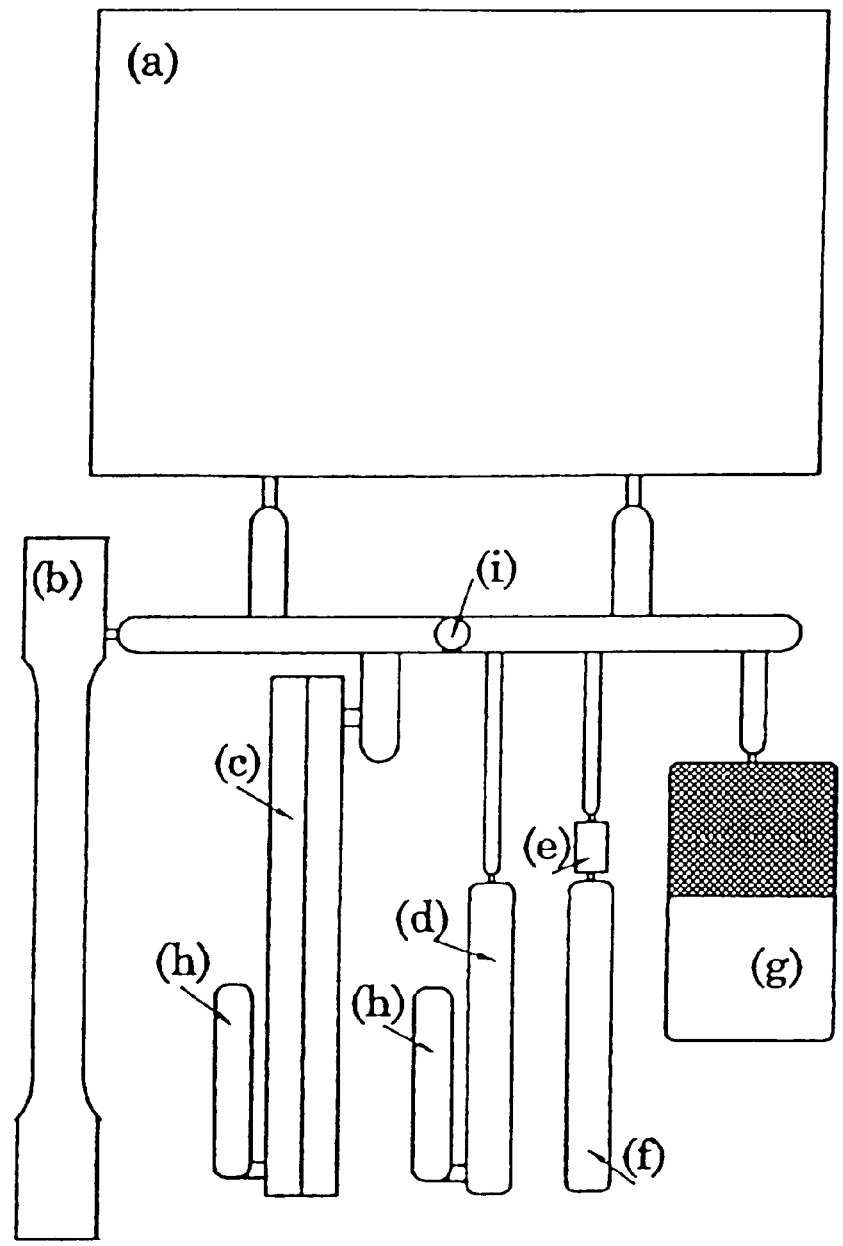
FIG. 1 shows joint-molded articles of various test pieces which are used in the examples of the present invention.
Explanation of Codes
(a) Falling weight test board
(b) Tensile test piece
(c) Heat deformation temperature test piece
(d) IZOD impact strength test piece
(e) Compression test piece
(f) Flexural strength test piece
(g) Color test board
(h) Resin reservoir
(i) Introducing port for molten resin

The present invention shall be explained below in further details with reference to examples and comparative examples.

Example 1

A 300 ml beaker was charged with 200 ml of demineralized water, and 3 g of tannic acid (Chinese gallotannin: extra pure reagent, manufactured by Koso Kagaku Co., Ltd.) was dissolved therein. Put therein was 100 g of silica powder (IMSIL A-25: average particle diameter of 3.2 $\mu$m, manufactured by Unimin Speciality Minerals Inc.). In this case, the amount of tannic acid corresponded to 3 wt %. This was stirred for 10 minutes by means of a glass bar. Then, the solution was filtered by suction through a Buchner funnel, and the filtrate was dried at 60° C. for 24 hours in a dryer (Model D-30: manufactured by Daiwa Kagaku Co., Ltd.). For the sake of convenience, this was designated as TN 3. Further, 2 g of a silane coupling agent (KBM503, manufactured by Shin-etsu Chemical Ind. Co., Ltd.) was added to 200 ml of xylene and dissolved therein, and TN 3 was added thereto. After stirring for 10 minutes by means of a glass bar, the solution was filtered similarly through the Buchner funnel, and the filtrate was dried similarly at 60° C. for one hour in the dryer to confirm that it did not smell xylene. This was added to 10 kg of a PC resin (Panlite L-1250; Mn: 24700, Mw: 60800, Mw/Mn: 2.46, IZOD impact strength: 66 kgfcm/cm, manufactured by Teijin Kasei Co., Ltd.), and they were mixed in a paper bag to find that they could be mixed in a state that the pellets were almost covered, though the powder was separated from the pellets to some extent at the bottom of the bag. The whole amount of this resin was put in a hopper of an injection-molding machine (Model IS-170, manufactured by Toshiba Machinery Co., Ltd.) and molded at a nozzle temperature of 280° C., an injection pressure of 995 kg/cm$^2$, a holding pressure of 595 kgf/cm$^2$, an injection time of 1.61 second and a holding time of 21.4 seconds by means of a die capable of joint-molding various test pieces to prepare various test pieces. Based are an IZOD impact test piece on JIS K7110, a tensile strength test piece on JIS K7113 and a flexural strength test piece on JIS K7203. Further, the resin was molded by means of a die capable of molding a plate of 2.5 mm×127 mm×254 mm at the same time. The molded articles thereof are shown in FIG. 1.

It was tried to recycle 100% of the PC material on the same molding conditions, and all the molded test pieces were crushed by means of a crusher (Model FNSK-15D: 1.5 kw, manufactured by Nissui Kako Co., Ltd.). The crushed resins were dried again at 110° C. for 4 hours by means of a dehumidifying dryer (Model DR-30Z, manufactured by Kawata Co., Ltd.) and a temperature controller (Model DN2-20-3, manufactured by Kato Riki Mfg. Co., Ltd.), and injection molding was repeated four times on the same conditions. The IZOD impact test piece has a size based on JIS K7110. This was prepared by means of a JISLD type IZOT tester manufactured by Toyo Seiki Seisakusho Co., Ltd., wherein a V notch was formed by means of Model B3515 manufactured by the same company. Thus, the impact strength was determined to find that it was 63 kgfcm/cm. Further, a part of this test piece was sampled and put in a conical flask equipped with a ground stopper together with a tetrahydrofuran (THF) solvent, and after controlling this combined system to a concentration of 0.05 wt %, the flask was left for standing in a room for a whole day and night to dissolve the combined system. Silica particles were filtered off and removed from this by means of a microfilter (GL Chromatodisk 13N, nonaqueous type, manufactured by Kurashiki Boseki Co., Ltd.) to prepare a sample for determining the PC molecular weight. The average molecular weight was determined by dissolving standard polystyrene (Standard PS, Mw/Mn=1.06, manufactured by Pressure Chemical Co., Ltd.) in advance in a THF solvent in the same concentration as that of the sample and relatively converting from the calibration curve of the molecular weight to the column discharge time. The results thereof are shown in Table 1.

Comparative Example 1

The IZOD impact strength was determined on the same conditions as in Example 1, except that PC containing nothing was used and injection-molded. The result thereof is shown together in Table 1.

Comparative Example 2

The IZOD impact strength and the molecular weight were determined in the same manners as in Example 1, except that the inorganic particles subjected to tannic acid treatment were not subjected to coupling agent treatment in Example 1. The result thereof is shown together in Table 1.

Example 2

Prepared was 5 kg of TN 3 obtained by treating anhydrous silica with 3 wt % of tannic acid in the same manner and procedure as in Example 1. Added to each 100 g taken from this were 0.4, 0.7, 1.5, 2.0, 3.0 and 4.0 wt % of the silane coupling agent to thereby prepare samples. For the sake of convenience, they are designated as TNS 0.4, TNS 0.7, TNS 1.5, TNS 2.0, TNS 3.0 and TNS 4.0. The IZOD impact strengths thereof were determined in the same manner as in Example 1, and the results thereof are shown together in Table 1. As can be found from this, the resins treated with the silane coupling agent are less reduced in an IZOD impact strength.

Comparative Example 3

Samples prepared by adding 0.2 and 4.5 wt % of the silane coupling agent which had not been involved in Example 2 were measured for IZOD impact strengths to obtain results shown in Table 1. As can be found from this, when the amount of the silane coupling agent is small, the IZOD impact strength is small, but even if it is large, so much effect can not be obtained.

Example 3

The same procedure as in Example 1 was repeated, except that PC was changed to a PBT resin (Julanex 3200, manufactured by Polyplastic Co., Ltd.), PET (Kurapet 1030, manufactured by Kuraray Co., Ltd.), a PC/ABS alloy (Ubeloy CX10A, manufactured by Ube Cycon Co., Ltd.) and PBT/ABS (Novaloy-B, B1500, manufactured by Daicel Chemical Ind. Co., Ltd.). The results thereof are shown together in Table 1.

Comparative Example 4

The respective resins used in Example 3 were repeatedly molded as they were in the same manner as in Example 1 to measure the IZOD impact strengths. The results thereof are shown together in Table 1. As can be found well from this, the resins containing no additives are reduced in IZOD impact strengths.

Table 1

TABLE 1

Results of examples and comparative examples

| | | IZOD impact strength kgfcm/cm | Molecular weight Mn | Molecular weight Mw | Dispersibility Mw/Mn |
|---|---|---|---|---|---|
| Example 1 | | 65 | 22,300 | 49,500 | 2.22 |
| Comparative Example 1 | | 29 | 19,100 | 45,800 | 2.40 |
| Example 2 | KNS 0.4 | 48 | — | — | — |
| | KNS 0.7 | 58 | — | — | — |
| | KNS 1.5 | 60 | — | — | — |
| | KNS 2.0 | 65 | 22,700 | 50,400 | 2.20 |
| | KNS 3.0 | 64 | — | — | — |
| | KNS 4.0 | 64 | — | — | — |
| Comparative Example 2 | | 11 | 22,300 | 50,600 | 2.27 |
| Comparative Example 3 | 0.2 wt % | 30 | | | |
| | 4.5 wt % | 55 | — | — | — |
| Example 3 | PC/ABS | 52 | | | |
| | PBT | 6 | — | — | — |
| | PET | 8 | | | |
| | PBT/ABS | 2 | | | |
| Comparative Example 4 | PC/ABS | 22 | — | — | — |
| | PBT | 1 | | | |
| | PET | 2 | | | |
| | PBT/ABS | 1 | | | |

Example 4

A 300 ml beaker was charged with 200 ml of demineralized water, and 3 g of tannic acid (Chinese gallotannin: extra pure reagent, manufactured by Koso Kagaku Co., Ltd.) was dissolved therein. Put therein was 100 g of silica powder (IMSIL A-25: average particle diameter of 3.2 $\mu$m, manufactured by Unimin Speciality Minerals Inc.). In this case, the amount of tannic acid corresponded to 3 wt %. This was stirred for 10 minutes by means of a glass bar. Then, the solution was filtered by suction through a Buchner funnel, and the filtrate was dried at 60° C. for 24 hours in the dryer (Model D-30: manufactured by Daiwa Kagaku Co., Ltd.). For the sake of convenience, this was designated as TN 3. Dissolved in 200 ml of xylene was 2 g of benzophenone (guaranteed reagent, manufactured by Wako Junyaku Ind. Co., Ltd.), and TN 3 was added thereto. This was stirred for 10 minutes by means of a glass bar and then filtered through the Buchner funnel. The filtrate was dried similarly at 60° C. for one hour to confirm that it did not smell xylene. This was designated as TNB 3. Next, 2 g of the silane coupling agent (KBM503, manufactured by Shin-etsu Chemical Ind. Co., Ltd.) was similarly added to 200 ml of xylene and dissolved, and TNB 3 was added thereto. After stirring for 10 minutes by means of a glass bar, the solution was filtered similarly through the Buchner funnel, and the filtrate was dried similarly at 60° C. for one hour in the dryer to confirm that it did not smell xylene. This was added to 10 kg of the PC resin (Panlite L-1250; Mn: 24700, Mw: 60800, Mw/Mn: 2.46, IZOD impact strength: 66 kgfcm/cm, manufactured by Teijin Kasei Co., Ltd.), and they were mixed in a paper bag to find that they could be mixed in a state that the pellets were almost covered, though the powder was separated from the pellets to some extent at the bottom of the bag. The whole amount of this resin was put in a hopper of the injection-molding machine (Model IS-170, manufactured by Toshiba Machinery Co., Ltd.) and molded at a nozzle temperature of 280° C., an injection pressure of 995 kgf/cm$^2$, a holding pressure of 595 kgf/cm$^2$, an injection time of 1.61 second and a holding time of 21.4 seconds by means of a die capable of joint-molding various test pieces to prepare various test pieces. Based are an IZOD impact test piece on JIS K7110, a tensile strength test piece on JIS K7113 and a flexural strength test piece on JIS K7203. Further, the resin was molded by means of a die capable of molding a plate of 2.5 mm×127 mm×254 mm at the same time. The molded articles thereof are shown in FIG. 1.

It was tried to recycle 100% of the PC material on the same molding conditions, and all the molded test pieces were crushed by means of the crusher (Model FNSK-15D: 1.5 kw, manufactured by Nissui Kako Co., Ltd.). The crushed resins were dried again at 110° C. for 4 hours by means of the dehumidifying dryer (Model DR-30Z, manufactured by Kawata Co., Ltd.) and the temperature controller (Model DN2-20-3, manufactured by Kato Riki Mfg. Co., Ltd.), and injection molding was repeated four times on the same conditions. The IZOD impact test piece has a size based on JIS K7110. This was prepared by means of the JISLD type IZOD tester manufactured by Toyo Seiki Seisakusho Co., Ltd., wherein a V notch was formed by means of Model B3515 manufactured by the same company. Thus, the impact strength was determined to find that it was 69 kgfcm/cm. Further, a part of this test piece was sampled and put in a conical flask equipped with a ground stopper together with a tetrahydrofuran (THF) solvent, and after controlling this combined system to a concentration of 0.05 wt %, the flask was left for standing in a room for a whole day and night to dissolve the combined system. Silica particles were filtered off and removed from this by means of the microfilter (GL Chromatodisk 13N, nonaqueous type, manufactured by Kurashiki Boseki Co., Ltd.) to prepare a sample for determining the PC molecular weight. The average molecular weight was determined by dissolving standard polystyrene (Standard PS, Mw/Mn=1.06, manufactured by Pressure Chemical Co., Ltd.) in advance in a THF solvent in the same concentration as that of the sample and relatively converting from the calibration curve of the molecular weight to the column discharge time. The results thereof are shown in Table 2.

Comparative Example 5

The IZOD impact strength was determined on the same conditions as in Example 4, except that PC containing nothing was used and injection-molded. The result thereof is shown together in Table 2.

Comparative Example 6

The IZOD impact strength and the molecular weight were determined in the same manners as in Example 4, except that the inorganic particles were changed to those subjected only to tannic acid treatment in Example 4. The result thereof is shown together in Table 2.

Example 5

Prepared was 5 kg of TN 3 obtained by treating anhydrous silica with 3 wt % of tannic acid in the same manner and procedure as in Example 4. Added to each 100 g taken from this were 0.4, 0.7, 1.5, 2.0, 3.0 and 4.0 wt % of benzophenone, and the coupling agent was fixed to 2 wt % to carry out treatment to thereby prepare samples. For the sake of convenience, they are designated as TNS 0.4, TNS 0.7, TNS 1.5, TNS 2.0, TNS 3.0 and TNS 4.0. The IZOD impact strengths thereof were determined in the same manner as in Example 4, and the results thereof are shown together in Table 2. As can be found from this, the resins treated with the silane coupling agent are less reduced in an IZOD impact strength.

Comparative Example 7

The same treatments as in Example 5 were carried out, except that samples were prepared by adding 0.2 and 4.5 wt % of benzophenone which had not been involved in Example 5, and the IZOD impact strengths were measured to obtain results shown in Table 2. As can be found from this, when the amount of benzophenone is small, the IZOD impact strength is relatively small, but even if it is large, so much effect can not be obtained.

Example 6

The same procedure as in Example 4 was repeated, except that PC was changed to a PBT resin (Julanex 3200, manufactured by Polyplastic Co., Ltd.), PET (Kurapet 1030, manufactured by Kuraray Co., Ltd.), a PC/ABS alloy (Ubeloy CX10A, manufactured by Ube Cycon Co., Ltd.) and PBT/ABS (Novaloy-B, B1500, manufactured by Daicel Chemical Ind. Co., Ltd.). The results thereof are shown together in Table 2.

Comparative Example 8

The respective resins used in Example 6 to which nothing was added were repeatedly molded as they were in the same manner as in Example 4 to measure IZOD impact strengths. The results thereof are shown together in Table 2. As can be found well from this, the resins containing no additives are reduced in IZOD impact strengths.

TABLE 2

Results of examples and comparative examples

| | | IZOD impact strength kgfcm/cm | Molecular weight Mn | Molecular weight Mw | Dispersibility Mw/Mn |
|---|---|---|---|---|---|
| Example 4 | | 69 | 22,800 | 50,200 | 2.20 |
| Comparative Example 5 | | 29 | 19,100 | 45,800 | 2.40 |
| Comparative Example 6 | | 11 | 22,300 | 50,600 | 2.27 |
| Example 5 | TNS 0.4 | 65 | | | |
| | TNS 0.7 | 65 | | | |
| | TNS 1.5 | 65 | — | — | — |
| | TNS 2.0 | 69 | | | |
| | TNS 3.0 | 68 | | | |
| | TNS 4.0 | 67 | — | — | — |
| Comparative Example 7 | 0.2 wt % | 65 | | | |
| | 4.5 wt % | 65 | — | — | — |
| Example 6 | PC/ABS | 54 | | | |
| | PBT | 7 | — | — | — |
| | PET | 8 | | | |
| | PBT/ABS | 2 | | | |
| Comparative Example 8 | PC/ABS | 22 | | | |
| | PBT | 1 | — | — | — |
| | PET | 2 | | | |
| | PBT/ABS | 1 | | | |

Example 7

A 300 ml beaker was charged with 200 ml of demineralized water, and 3 g of tannic acid (Chinese gallotannin:

extra pure reagent, manufactured by Koso Kagaku Co., Ltd.) was dissolved therein. Put therein was 100 g of silica powder (IMSIL A-25: average particle diameter of 3.2 μm, manufactured by Unimin Speciality Minerals Inc.). In this case, the amount of tannic acid corresponded to 3 wt %. This was stirred for 10 minutes by means of a glass bar. Then, the solution was filtered by suction through a Buchner funnel, and the filtrate was dried at 60° C. for 24 hours in the dryer (Model D-30: manufactured by Daiwa Kagaku Co., Ltd.). For the sake of convenience, this was designated as TN 3. Dissolved in 200 ml of demineralized water was 2 g of glucose (guaranteed reagent, manufactured by Wako Junyaku Ind. Co., Ltd.), and TN 3 was added thereto. This was stirred for 10 minutes by means of a glass bar and then filtered by suction through the Buchner funnel. The filtrate was dried similarly at 60° C. for 24 hours. This was designated as TNB 3. Next, 2 g of the silane coupling agent (KBM503, manufactured by Shin-etsu Chemical Ind. Co., Ltd.) was added to 200 ml of xylene and dissolved therein, and TNB 3 was added thereto. After stirring for 10 minutes by means of a glass bar, the solution was filtered similarly through the Buchner funnel, and the filtrate was dried similarly at 60° C. for one hour in the dryer to confirm that it did not smell xylene. This was added to 10 kg of the PC resin (Panlite L-1250; Mn: 24700, Mw: 60800, Mw/Mn: 2.46, IZOD impact strength: 66 kgfcm/cm, manufactured by Teijin Kasei Co., Ltd.), and they were mixed in a paper bag to find that they could be mixed in a state that the pellets were almost covered, though the powder was separated from the pellets to some extent at the bottom of the bag. The whole amount of this resin was put in a hopper of the injection-molding machine (Model IS-170, manufactured by Toshiba Machinery Co., Ltd.) and molded at a nozzle temperature of 280° C., an injection pressure of 995 kgf/cm$^2$, a holding pressure of 595 kgf/cm$^2$, an injection time of 1.61 second and a holding time of 21.4 seconds by means of a die capable of joint-molding various test pieces to prepare various test pieces. Based are an IZOD impact test piece on JIS K7110, a tensile strength test piece on JIS K7113 and a flexural strength test piece on JIS K7203. Further, the resin was molded by means of a die capable of molding a plate of 2.5 mm×127 mm×254 mm at the same time. The molded articles thereof are shown in FIG. 1.

It was tried to recycle 100% of the PC material on the same molding conditions, and all the molded test pieces were crushed by means of the crusher (Model FNSK-15D: 1.5 kw, manufactured by Nissui Kako Co., Ltd.). The crushed resins were dried again at 110° C. for 4 hours by means of the dehumidifying dryer (Model DR-30Z, manufactured by Kawata Co., Ltd.) and the temperature controller (Model DN2-20-3, manufactured by Kato Riki Mfg. Co., Ltd.), and injection molding was repeated four times on the same conditions. The IZOT impact test piece has a size based on JIS K7110. This was prepared by means of the JISLD type IZOD tester manufactured by Toyo Seiki Seisakusho Co., Ltd., wherein a V notch was formed by means of Model B3515 manufactured by the same company. Thus, the impact strength was determined to find that it was 67 kgfcm/cm. Further, a part of this test piece was sampled and put in a conical flask equipped with a ground stopper together with a tetrahydrofuran (THF) solvent, and after controlling this combined system to a concentration of 0.05 wt %, the flask was left for standing in a room for a whole day and night to dissolve the combined system. Silica particles were filtered off and separated from this by means of the microfilter (GL Chromatodisk 13N, nonaqueous type, manufactured by Kurashiki Boseki Co., Ltd.) to prepare a sample for determining the PC molecular weight. The average molecular weight was determined by dissolving standard polystyrene (Standard PS, Mw/Mn=1.06, manufactured by Pressure Chemical Co., Ltd.) in advance in a THF solvent in the same concentration as that of the sample and relatively converting from the calibration curve of the molecular weight to the column discharge time. The results thereof are shown in Table 3.

Comparative Example 9

The IZOD impact strength was determined on the same conditions as in Example 7, except that PC containing nothing was used and injection-molded. The result thereof is shown together in Table 3.

Comparative Example 10

The IZOD impact strength and the molecular weight were determined in the same manners as in Example 7, except that the inorganic particles were changed to those subjected only to tannic acid treatment in Example 7. The result thereof is shown together in Table 3.

Example 8

Prepared was 5 kg of TN 3 obtained by treating anhydrous silica with 3 wt % of tannic acid in the same manner as in Example 7. Added to each 100 g taken from this were 0.4, 0.7, 1.5, 2.0, 3.0 and 4.0 wt % of glucose, and the coupling agent was fixed to 2 wt % to carry out treatment to thereby prepare samples. For the sake of convenience, they are designated as TNS 0.4, TNS 0.7, TNS 1.5, TNS 2.0, TNS 3.0 and TNS 4.0. The IZOD impact strengths thereof were determined in the same manner as in Example 7, and the results thereof are shown together in Table 3. As can be found from this, the resins treated with the silane coupling agent are less reduced in an IZOD impact strength.

Comparative Example 11

The same treatments as in Example 8 were carried out, except that samples were prepared by adding 0.2 and 4.5 wt % of glucose which had not been involved in Example 8, and the IZOD impact strengths were measured to obtain results shown in Table 3. As can be found from this, when the amount of glucose is small, the IZOD impact strength is relatively small, but even if it is large, so much effect can not be obtained.

Example 9

The same procedure as in Example 7 was repeated, except that PC was changed to a PBT resin (Julanex 3200, manufactured by Polyplastic Co., Ltd.), PET (Kurapet 1030, manufactured by Kuraray Co., Ltd.), a PC/ABS alloy (Ubeloy CX10A, manufactured by Ube Cycon Co., Ltd.) and PBT/ABS (Novaloy-B, B1500, manufactured by Daicel Chemical Ind. Co., Ltd.). The results thereof are shown together in Table 3.

Comparative Example 12

The respective resins used in Example 9 to which nothing was added were repeatedly molded as they were in the same manner as in Example 7 to measure the IZOD impact strengths. The results thereof are shown together in Table 3. As can be found well from this, the resins containing no additives are reduced in IZOD impact strengths.

TABLE 3

Results of examples and comparative examples

|  |  | IZOD impact strength kgfcm/cm | Molecular weight Mn | Molecular weight Mw | Dispersibility Mw/Mn |
|---|---|---|---|---|---|
| Example 7 |  | 67 | 22,700 | 50,100 | 2.21 |
| Comparative Example 9 |  | 29 | 19,100 | 45,800 | 2.40 |
| Comparative Example 10 |  | 11 | 22,300 | 50,600 | 2.27 |
| Example 8 | TNS 0.4 | 60 |  |  |  |
|  | TNS 0.7 | 60 |  |  |  |
|  | TNS 1.5 | 61 | — | — | — |
|  | TNS 2.0 | 67 |  |  |  |
|  | TNS 3.0 | 67 |  |  |  |
|  | TNS 4.0 | 65 |  |  |  |
| Comparative Example 11 | 0.2 wt % | 52 |  |  |  |
|  | 4.5 wt % | 63 | — | — | — |
| Example 9 | PC/ABS | 50 |  |  |  |
|  | PBT | 7 | — | — | — |
|  | PET | 8 |  |  |  |
|  | PBT/ABS | 2 |  |  |  |
| Comparative Example 12 | PC/ABS | 22 |  |  |  |
|  | PBT | 1 | — | — | — |
|  | PET | 2 |  |  |  |
|  | PBT/ABS | 1 |  |  |  |
| Example 10 |  | 65 | — | — | — |
| Example 11 |  | 63 | — | — | — |
| Example 12 |  | 59 | — | — | — |

Example 10

The same procedure as in Example 7 was repeated, except that sugar (commercial granulated sugar) was substituted for glucose in Example 7. As a result thereof, the IZOD impact strength of 65 kgfcm/cm was obtained.

Example 11

The same procedure as in Example 7 was repeated, except that saponin (made from a tea seed, manufactured by Wako Junyaku Ind. Co., Ltd.) was substituted for glucose in Example 7. As a result thereof, the IZOD impact strength of 63 kgfcm/cm was obtained.

Example 12

The same procedure as in Example 7 was repeated, except that dextrin (chemical grade, manufactured by Wako Junyaku Ind. Co., Ltd.) was substituted for glucose in Example 7. As a result thereof, the IZOD impact strength of 59 kgfcm/cm was obtained.

What is claimed is:

1. A resin additive prepared by subjecting inorganic particles to surface treatment with tannic acid and further subjecting them to surface treatment with a coupling agent.

2. The resin additive as described in claim 1, wherein the inorganic particles subjected to surface treatment with tannic acid are subjected to surface treatment with the coupling agent in an amount of 0.4 to 4.2 wt % of the inorganic particles subjected to surface treatment with tannic acid.

3. A resin additive prepared by subjecting inorganic particles to surface treatment with tannic acid and then subjecting them to surface treatment with a phenone compound, followed by further subjecting them to surface treatment with a coupling agent.

4. The resin additive as described in claim 3, wherein the inorganic particles subjected to surface treatment with tannic acid are subjected to surface treatment with the phenone compound corresponding to 0.4 to 4.2 wt % of said inorganic particles and further subjected to surface treatment with the coupling agent corresponding to 0.4 to 4.2 wt % of the inorganic particles subjected to surface treatment with tannic acid.

5. A resin additive prepared by subjecting inorganic particles to surface treatment with tannic acid and then subjecting them to surface treatment with saccharides, followed by further subjecting them to surface treatment with a coupling agent.

6. The resin additive as described in claim 5, wherein the inorganic particles subjected to surface treatment with tannic acid are subjected to surface treatment with the saccharides corresponding to 0.4 to 4.2 wt % of said inorganic particles and further subjected to surface treatment with the coupling agent corresponding to 0.4 to 4.2 wt % of the inorganic particles subjected to surface treatment with tannic acid.

7. The resin additive as described in claim 5, wherein the saccharides are sugar, polysaccharides or a mixture thereof.

8. The resin additive as described in any of claims 1, 3 and 5, wherein the coupling agent is a silane base coupling agent.

9. The resin additive as described in any of claims 1, 3 and 5, wherein the inorganic particle is silica, alumina, a salt thereof or glass.

10. A resin composition comprising a thermoplastic polycarbonate base resin and the resin additive of any one of claims 1, 3 or 5.

11. A resin composition comprising a thermoplastic polyester base resin and the resin additive of any one of claims 1, 3 or 5.

* * * * *